United States Patent [19]

Halloway

[11] Patent Number: 5,013,011
[45] Date of Patent: May 7, 1991

[54] SELF-DEPLOYING STABILIZING JACK

[76] Inventor: Lowell E. Halloway, 17 Brook Haven, Mt. Vernon, Ill. 62864

[21] Appl. No.: 367,949

[22] Filed: Jun. 19, 1989

Related U.S. Application Data

[63] Continuation-in-part of Ser. No. 63,008, Jun. 17, 1987, abandoned.

[51] Int. Cl.⁵ .............................................. B66F 9/02
[52] U.S. Cl. ................................ 254/423; 254/89 H; 340/431
[58] Field of Search ............. 254/420, 423, 89 H; 280/6.1, 6.11, 6 H; 340/52 R, 686, 431

[56] References Cited

U.S. PATENT DOCUMENTS

| | | | |
|---|---|---|---|
| 3,362,683 | 1/1968 | Hansen | 254/423 |
| 3,817,493 | 6/1974 | Hanser | 254/423 |

Primary Examiner—J. J. Hartman
Attorney, Agent, or Firm—Don W. Weber

[57] ABSTRACT

A self-deploying stabilizing support jack is presented which stabilizes and positions a recreational vehicle or trailer. The support jack comprises a bracket, a two-way cylinder, lift arms, a stabilizing sleeve and several electrical warning devices and safety features. The lift arms and cylinder are attached to the bracket at separate, offset first and second points so that when the ram of the cylinder contacts the foot of the lift arm, the entire apparatus is raised to a horizontal position. A stabilizing sleeve attached to the lift and surrounding the cylinder stabilizes the device from lateral movement. An intermediate third pivot point in the lift arm helps reduce stress upon raising. Several signalling devices warn the operator when the support jack is in the deployed position. A safety circuit automatically raises any support jack that is not in the horizontal safety position should the ignition be turned to the "on" position. The safety circuit may be overridden by a cut-out switch, if desired, however the blinking red light and buzzer warning remains energized.

1 Claim, 3 Drawing Sheets

SELF-DEPLOYING STABILIZING JACK

This application is a Continuation-in-Part of co-pending patent application Ser. No. 063,008 now abandoned which also deals with a self-deploying stabilizing jack.

BACKGROUND OF THE INVENTION

The instant invention relates to the field of vehicle jacks and, particularly, to the area of load-levelling supports for trailers or motor homes. With the recent advent and widespread use of recreational vehicles, a need has arisen to provide a level, non-wheel support for such units. While numerous devices have been advanced to support vehicles, all have involved high-stress designs and few or no safety features. While the idea of using offset pivot points to raise a jack from the vertical position has heretofore been known in the art (See, for example, Hansen, U.S. Pat. No. 3,362,683), these types of support devices require a high-stress torque arm to accomplish the deployment and are unstable because they depend upon the hydraulic cylinder itself for stability in all directions. While other devices provide stabilizing devices in addition to the deployment apparatus, as in Hauser, U.S. Pat. No. 3,817,493, none of the current inventions solves the problem of a structure sufficiently stable yet placing little stress on the horizontal actuating member.

Safety features or warning devices are virtually unknown in the field and it is an object of this invention to supply a safe device for levelling vehicles.

The present invention also provides both a low-stress retracting mechanism and a simple stabilizing mechanism. By employing three pivot points rather than two and a stabilizing sleeve rather than a complicated latching mechanism, the instant device solves both problems. Additionally, the present invention provides simple, yet effective, safety and signalling mechanisms to further enhance the self-deploying vehicle jack. The invention also provides a safety mechanism which automatically raises any deployed jack should the ignition switch be turned on while the jacks are deployed. A manual override switch allows the operator to run the engine with the jacks deployed, should that condition be desired.

One object of this invention is to provide a low-stress highly stable vehicle jack. Another object of this invention is to provide a vehicle jack with pressure and position signalling safety features to enhance the utility of self-deploying vehicle jacks. A still further object of this invention is to provide a simple yet sturdy vehicle stabilizing device that automatically deploys jacks and signals the operator when in an activated position. Other and further objects of the invention will become obvious upon perusal of the Specifications herein.

BRIEF SUMMARY OF THE INVENTION

The present invention comprises a mounting plate and bracket which is attached to the underside of a vehicle. Normally, four brackets and jacks are used, one mounted to each corner of the vehicle. The bracket, which is attached to a mounting plate, is U-shaped and has a horizontal top and two opposed vertical legs. The jack is pivotably attached to the mounting bracket by a first pivot pin located at the top and to the side of the jack. Positioned in the bracket are lower and offset second lower pivot points. The cylinder is attached at the first pivot point and a lift arm is attached to the second pivot point. The lift arm comprises an upper and lower leg, the legs being attached to a third pivot point. On the bottom of the lower lift leg is a lift plate. The upper part of the lower lift leg has a stabilizing slidable sleeve which fits around the cylinder. As the ram of the cylinder retracts, it contacts the lift plate. This lift plate in turn applies pressure to the lower lift arm, thence through the third pivot point to the upper lift arm. Since the lift arm is offset from the cylinder pivot, a 1¼ inch displacement of the ram (after contacting of the lift plate) raises the entire apparatus into a horizontal position about the first pivot point. A spring helps to insure a vertical deployment of the jack. Since the stabilizing sliding sleeve is firmly attached to the lower lift arm and secured about the cylinder, the entire apparatus is stabilized. A normally open magnetic switch operates a red light inside the vehicle cab to signal when the jack is deployed. A second red light and buzzer signal the operator when any jack is deployed and the engine is in the "on" position. An automatic raise circuit automatically raises a jack when the ignition switch is on. The safety circuit which automatically raises any deployed jack when the ignition switch is turned "on" may be overridden by a special cut-out switch. However, the warning light and buzzer continue to operate until the ignition switch is turned "off" or the jack is raised to the horizontal position.

FIG. is a side view of the apparatus with the foot nearly engaging the lift plate for the retracting of the cylinder.

Figure 3:
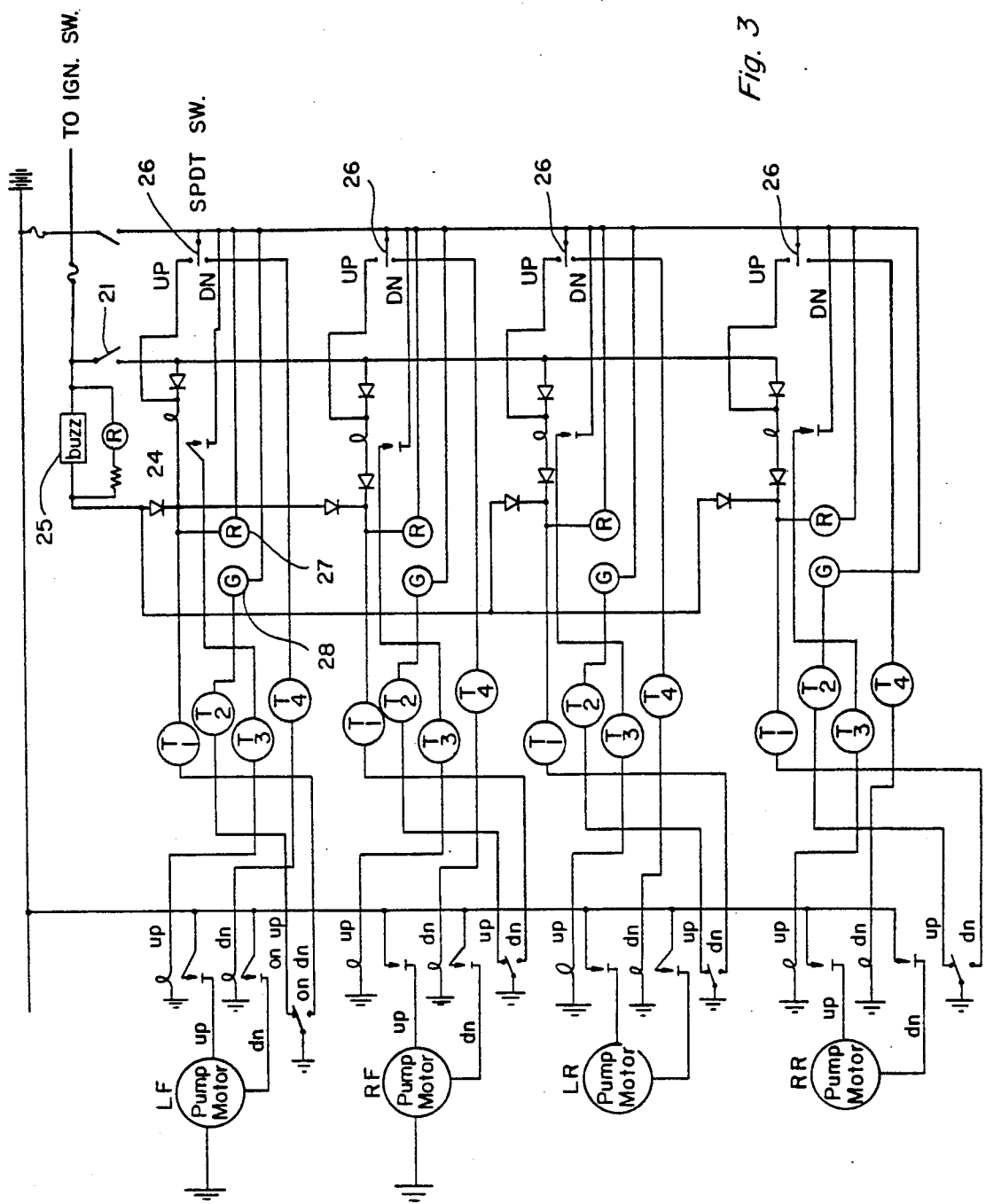

FIG. 3 is a schematic of the wiring circuitry of the invention.

DETAILED DESCRIPTION OF THE PREFERRED EMBODIMENT

The basic structure of the self-deploying hydraulic jack comprises a bracket, a 2-way cylinder, a lift arm, an automatic pressure release valve, a magnetic signalling device and a number of electronic safety features.

Figure 2:
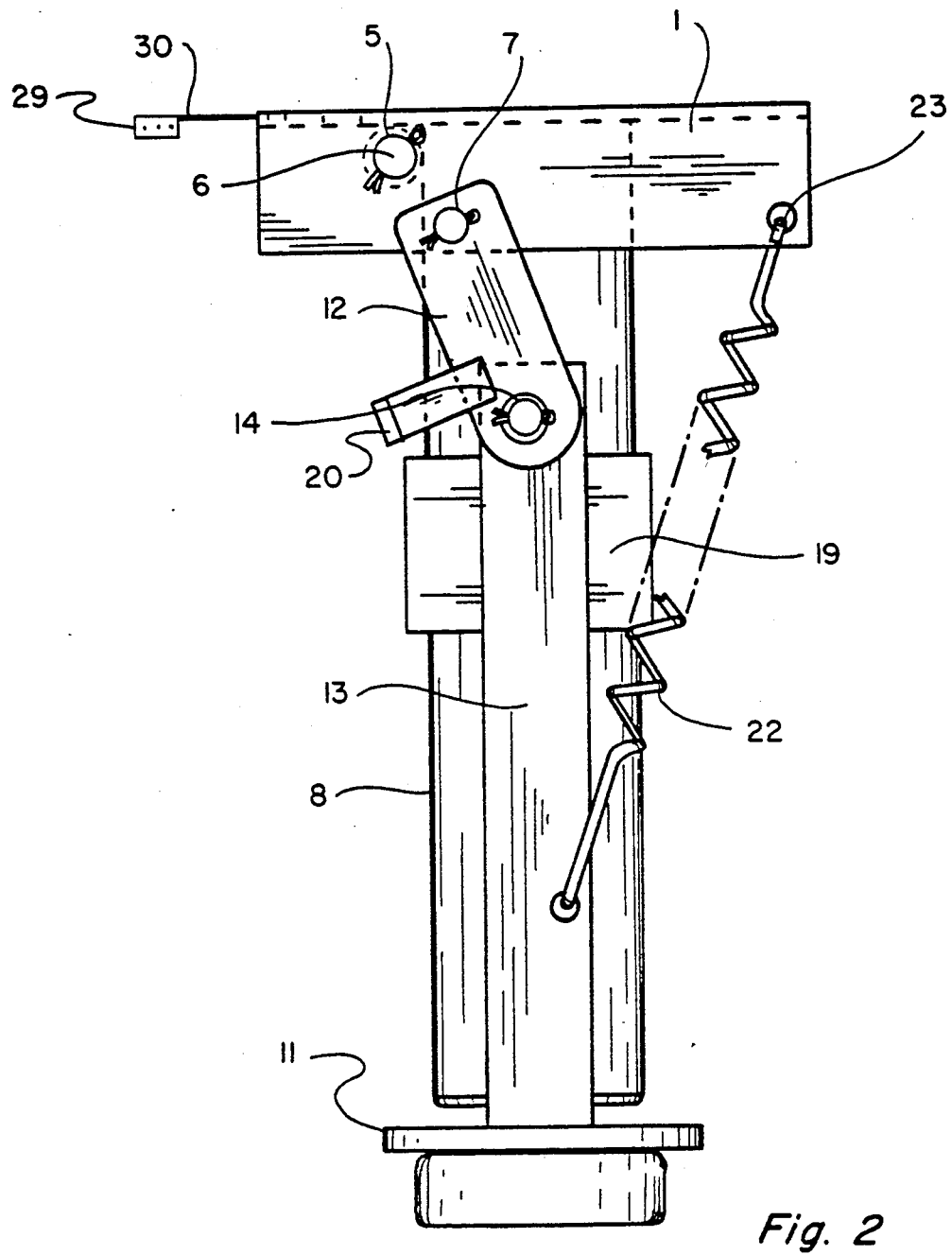

The bracket 1 is of an inverted U-shaped having a horizontal part 2 and opposed vertical legs 3 and 4. The bracket is attached to the frame of the vehicle. At the top edge of the jack is an upper first pivot bracket pin 5 through which a first pivot pin 6 is inserted. The preferred embodiment, to which all of the following sizes and dimensions relates, has a first pivot pin of 5/8 inch diameter. This shaft pivotably attaches the top of the cylinder to the bracket. The bracket also has a second, lower, offset pair of opposed pins 7, shown on FIG. 2. These second pivot pins 7 are set below and offset apart from the first pivot pin 6, as best shown in FIG. 2.

The cylinder comprises an outer cylinder 8 and a ram portion 9. The upper part of the outer cylinder is attached to the top edge of the cylinder at the first pivot bracket 5 by the first pivot pin 6. Pivot pin bracket 5 is welded to the top edge of the cylinder (as best shown on FIG. 2). This allows the cylinder to support the load on a flat plate on the top end of the cylinder. This pivot pin bracket preferably comprises a hollow cylinder welded to the side of the cylinder. The lower portion of the ram has a foot 10 at the bottom thereof. The foot has a circular cross-section and ultimately contacts the lift plate 11 upon retraction.

The lifting mechanism comprises an upper 12 and lower 13 lift arm. These upper and lower arms are connected about a third pivot point 14 as shown on FIG. 2. The upper lift arm is an essentially rectangular plate approximately 1¼" wide and ¼ thick. The upper portion of the upper lift arm has an upper hole 15 therein which allows the upper lift arm to be pivotably attached to the bracket about the lower, offset, second pivot point 7. The lower portion of the upper lift arm has lower third pivot holes 16.

Figure 1:
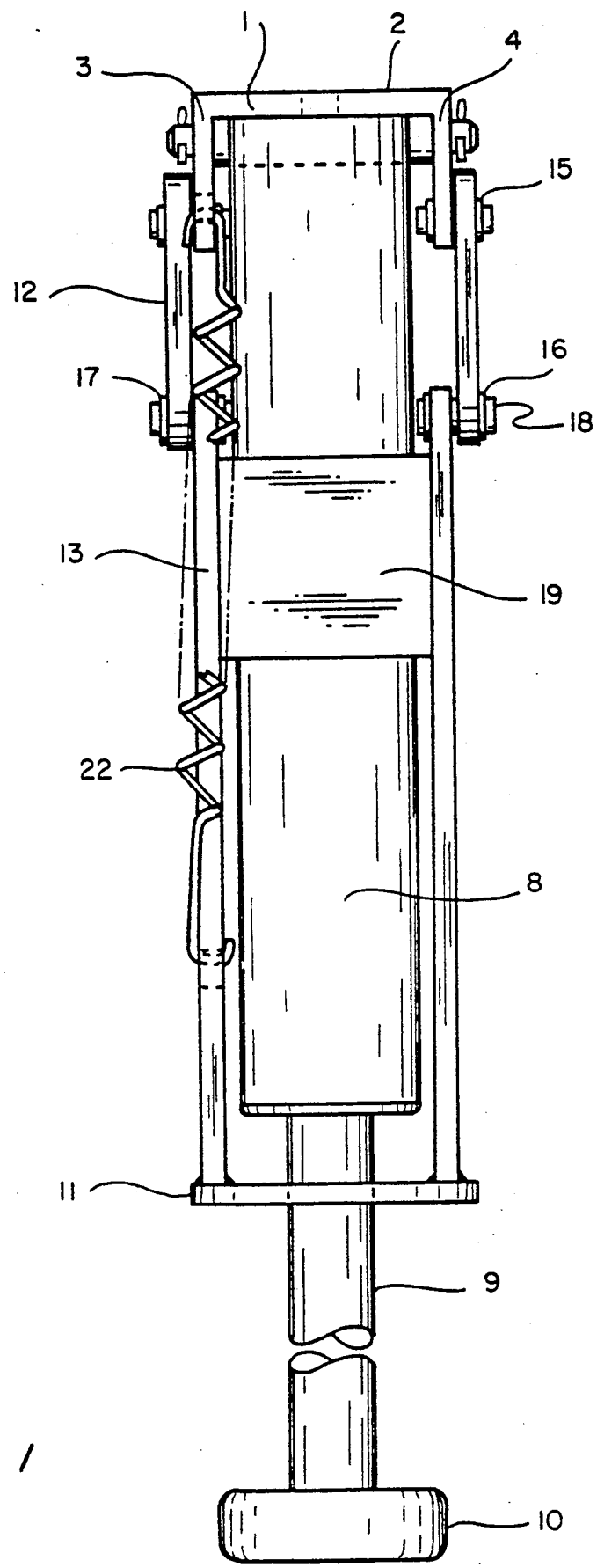
FIG. 1 is a front view of the apparatus in the deployed position.

Each upper and lower lift arm has an opposed lift arm positioned on the opposite side of the cylinder. The lower lift arm has a hole 17, FIG. 1, in the upper part thereof. A short pin 18 on each side of the cylinder pivotably attaches the upper and lower lift arms. Around the cylinder and fixedly attached to the upper part of each lower lift arm is a stabilizing sliding sleeve 19. This sliding sleeve surrounds the circular cylinder and slides up or down the cylinder depending upon the state of extension of the cylinder. The sleeve is welded to the lower lift arms in the preferred embodiment. At the lower end of the lower lift arm is a lift plate 11. This lift plate is also circular and has a hole in the center thereof to allow the ram to project therethrough.

To insure correct positioning of the cylinder a deploying spring 22 is attached to the lower lift arm 13 and to the bracket 1 at spring bracket hole 23.

Each cylinder is raised up and down by means of a separate pump, as shown on the schematic, FIG. 3.

An added feature on the preferred embodiment to keep the vehicle from being moved when the cylinder is in its deployed (down) position is a control panel located on the dash within the cab of the vehicle. This control panel comprises separate raise and lower switches 26 for each cylinder as well as a red warning light 27 for each cylinder as shown in the schematic, FIG. 3. In addition to this red warning light (which comes on whenever the cylinder is lowered more than about 2" from the horizontal), the present device has a red-blinking danger light 24 and a loud buzzer 25. The lights may be either LED type or normal 12 volt lamps. If LED lights are used for this purpose, a suitable resistor should be placed in the circuit between the LED and the positive side of the cirucit. These latter two warnings are activated whenever the cylinder is in the "deployed" (i.e., more than about 2" from horizontal) position and when the vehicle ignition is activated. The buzzer and danger light for each cylinder are activated by a normally open magnetic switch. The switch comprises a magnet 20 mounted on the upper lift arm 12 and a corresponding contact 29. When the device is horizontal, the cylinder and bracket are adjacent to each other and the danger switch is in the normally open mode. A green light 28 on the dash signals this condition, indicating that the cylinder position is safe. When the hydraulic cylinder is activated by the appropriate switch and the cylinder and connecting apparatus moves to the vertical or deployed position, the circuit closes causing the individual cylinder red danger light 27 to become activated. Should the ignition switch also become activated, the second red danger light 24 and buzzer 25 will signal the operator of the vehicle. Although a magnetic switch has been found to be the preferred embodiment of this invention, a mercury switch or other suitable switching device could also be employed. In practice, it is necessary to use a nonmagnetic attaching device for the magnet on the cylinder. The cylinder pumps are automatically shut off when the jack reaches the horizontal position. For lowering the jacks, one simply holds down the pump switch 26 until deployment is complete.

A still further safety feature includes a safety circuit (shown in schematic, FIG. 3) which automatically raises any deployed jack should the ignition switch be turned on while such deployed jack is down. This circuit would override the normal operating switches and raise any deployed jack until such jack is raised to the safe horizontal position. At the point where the jack is then raised to the safe position, the normal operation of the magnetic or mercury switches shut off the jack pressure pump.

With the ignition turned on and a cylinder down, the safety circuit automatically raises the lowered cylinder. During the raising operation the second red light 24 and buzzer 25 will warn the driver of this condition. Once the cylinder is raised the magnetic switch 20 operates to stop the cylinder pump and signal to the operator that the condition is now safe, by ceasing the operation of the second red light and buzzer.

If it is desired to turn on the ignition switch and leave the cylinders down (as, for example, when the operation of the vehicle engine is needed to warm the vehicle) an automatic raise circuit is provided as shown in FIG. 3. However, such a condition will also operate to energize the second red light and buzzer. A blue lighted cut-out switch 21 may be opened to allow the motor to run while the cylinders remain down. However, the red light 24 and buzzer 25 remain energized to warn the operator of this condition.

In actual operation, the deploying spring 22 and gravity deploy the device to the vertical position. The action of the retracting ram on the lift plate, through the offset pivot points raises the device to the horizontal. Due to the unique arrangement of the cylinder and the upper and lower lift legs, the device may be raised by a low-stress power stroke, due to the presence of the third pivot point and the overall design. In actual practice, the dimensions given herein allow the entire device to be raised by only 1¼" of compressive stroke of the ram. Obviously, the dimensions herein could be changed so as to create more or less lift per inch of compression stroke. However, the spacing and measurements herewith provide the most efficient and preferred embodiment of the present invention. The precise measurements given here are meant as illustration only and not meant to limit the application of the present submission. The pins, lift arms, lift plate and sliding sleeve are preferably made of steel. The magnet 20 on the upper lift arm 12 and the magnetic contact 29 on the aluminum extension bracket 30 are secured by means of aluminum brackets. The stabilizing sliding sleeve 19 is welded to the lower lift arm preferably, although any suitable fixed attachment method is acceptable.

In practice it has been found that a modified Model PMC5412 2½×12 cylinder, manufactured by Prince Hydraulics (4600 South Lewis, Sioux City, Iowa) is quite suitable for this application, although other cylinders are acceptable and interchangeable herein.

I claim:

1. A self-deploying jack support system for a vehicle with an electric ignition system, comprising:
   (1) a plurality of inverted U-shaped brackets each having opposed upper first pivot holes and opposed off-set lower second pivot holes;
   (2) a corresponding two-way cylinder for each of said brackets, each cylinder having an upper outer cylinder portion pivotally attached about said first corresponding holes and a lower ram portion having a foot at the lower end thereof;

(3) for each bracket and corresponding cylinder a flat upper lift arm having its upper portion pivotally attached about said second corresponding pivot holes and having opposed third pivot holes at its lower end;

(4) for each bracket and corresponding cylinder a flat lower lift arm having its upper end pivotally attached about said third corresponding pivot holes said lift arm further comprising a stabilizing sleeve attached to the upper end of said lower lift arm and having a lift plate at the lower end thereof, said bracket, corresponding cylinder and lift arms comprising a jack support;

(5) a means for deploying each cylinder;

(6) for each jack support an individual first safety means for signalling the operator of said jack support system when any individual jack support is in the deployed or non-deployed position;

(7) a second safety means which visually and audibly warns the operator of said jack support system when any jack support is deployed when the ignition "ON" and which raises said jack support whenever the ignition switch to the vehicle is turned "ON" and the jack support is in the deployed position; and (8) an electrical cut-out switch for deploying one or more jacks when the ignition is "ON";

whereby, when a plurality of jack supports are attached to a vehicle, the vehicle may be supported by said jack supports, and further, warning signals visually alert the operator if each jack is deployed and visually and audibly alert the operator and raise the jack support if any jack support is deployed with the ignition in the "ON" position, and, whereby, one or more jacks may remain deployed with the ignition in the "ON" position by using only the electric cut-out switch.

* * * * *